Feb. 22, 1966     J. A. BOMBARDIER ETAL     3,236,568
SNOW-EXPELLING SYSTEM FOR ENDLESS TRACK VEHICLE
Filed May 25, 1964

INVENTOR
Joseph Armand BOMBARDIER
                         deceased
By    Germain Bombardier
      Yvonne Bombardier nee
                          Labrecque
    Paul-Emile Fortier
By:   representing Sherbrooke Trust
                          Company Pierre l'espérance
AGENT

United States Patent Office 3,236,568
Patented Feb. 22, 1966

3,236,568
SNOW-EXPELLING SYSTEM FOR ENDLESS TRACK VEHICLE

Joseph Armand Bombardier, deceased, late of Valcourt, Quebec, Canada, by Germain Bombardier and Yvonne Labrecque Bombardier, both of Valcourt, Quebec, Canada, and Sherbrooke Trust Company, Sherbrooke, Quebec, Canada, executors
Filed May 25, 1964, Ser. No. 371,172
1 Claim. (Cl. 305—12)

The present invention relates to endless track motor vehicles for use over rough terrain and more particularly over snow. More specifically, the present invention is an improvement to the endless track system of the vehicle described in U.S. Patent No. 3,023,824 dated March 6, 1962, by the same inventor, and using an endless tread such as described in U.S. Patent 2,899,242 dated August 11, 1959, by Germain Bombardier.

The above-noted endless tread consists of a flexible band, preferably made of rubber, and provided with two rows of spaced holes adjacent the longitudinal edges of the band to receive the teeth of driving sprocket wheels at the front of the vehicle and the teeth of idle sprocket wheels mounted at the back of the vehicle and guiding the endless tread.

Moreover, a series of pairs of supporting wheels are disposed within the endless tread loop and are part of the suspension system of the vehicle.

In this arrangement, the supporting sprocket wheels are in contact not only with the lower ground-engaging run of the endless tread, but also with the upper return run.

It has been found that under certain snow conditions, especially when the snow is wet or when the vehicle moves in deep snow, that a certain quantity of snow enters the open sides of the endless tread and accumulates at the back of the tread in the curved portion thereof connecting the upper and lower runs and between the back sprocket wheels.

The accumulation of snow is such that it sometimes finally fills completely the space between the upper and lower runs of the endless tread, thereby constituting a relatively important dead-weight, which has to be carried by the vehicle and which, therefore, causes slowing down of the vehicle and, moreover, it even happens that the supporting wheels are entirely raised by the snow out of contact with the lower run of the endless tread.

The general object of the present invention resides, therefore, in the provision of means in association with an endless tread system of the character described, for expelling the snow or other foreign material from the inside of the tread, to thereby obviate to the above-noted disadvantages.

Another important object of the present invention resides in the provision of a snow-expelling system associated with an endless tread system for snow-going vehicles, which operates by centrifugal force and which is directly mounted on the shaft of at least one of the pairs of wheels of the endless tread system, thereby enabling to considerably simplify the construction of the snow-expelling system.

Yet another object of the present invention resides in the provision of a snow-expelling system of the character described, in which the snow-expelling means are mounted on the shaft of the back idle sprocket wheels, whereby, although the snow or other material can enter the open sides of the endless track arrangement, said material is immediately expelled from the said two open sides as soon as it reaches the back curved part of the endless tread, to thereby prevent accumulation of said foreign material, while enabling to construct the endless track system with open sides in order to have easy access to the suspension system of the endless tread.

The foregoing and other important objects of the present invention will become more apparent during the following disclosure and by referring to the drawings, in which.

Figure 1:
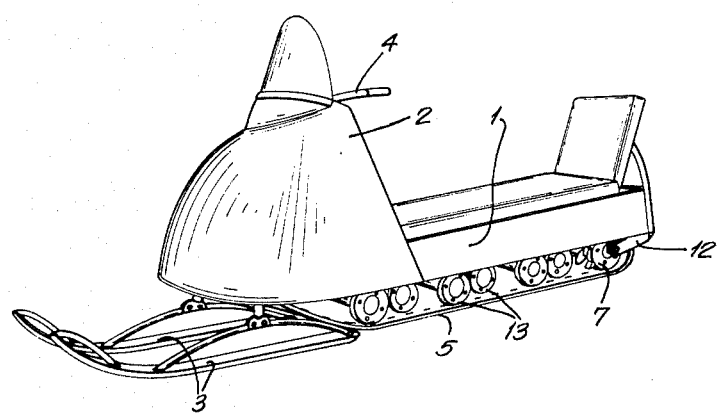
FIGURE 1 is a perspective view of a snow-going vehicle provided with a snow-expelling system in accordance with the invention.
Figure 3:
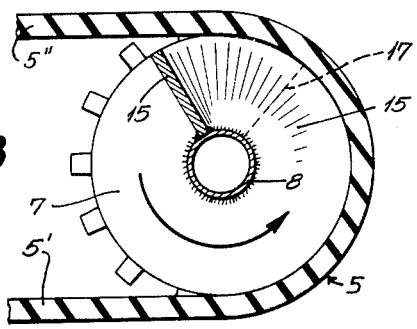
FIGURE 3 is a cross-section taken along line 3—3 of FIGURE 2.

Referring now particularly to the drawings in which like reference characters indicate like elements throughout, the snow-expelling system in accordance with the present invention will be described as applied to a snow-going vehicle of the type described in the above-noted U.S. Patent 3,023,824, but is applicable in combination with the endless track system of other vehicles.

The vehicle of the above-noted patent comprises a frame 1, preferably consisting of a sheet metal inverted U-shaped member. The front part of frame 1 is provided with a hood 2 forming protection for the operator and also for the internal combustion engine driving the vehicle.

Snow-going skis 3 are mounted under hood 2 and are guided by steering handles 4. An endless tread 5 is disposed rearwardly of skis 3 and mounted underneath frame 1 and partially within the latter.

Endless tread 5 consists of a flexible band, preferably made of vulcanized rubber, said band being preferably as described in the above-noted U.S. Patent 2,899,242. Endless tread 5 has adjacent each longitudinal edge a row of holes 6 adapted to receive the teeth of sprocket wheels at the front and back of the endless tread.

The front sprocket wheels are directly driven by the vehicle engine, while the back sprocket wheels are mounted for free rotation and are indicated at 7 in the drawings.

The pair of sprocket wheels 7, made of rubber, are mounted on a hollow transverse shaft 8 and secured by internal and external flanges 9 and 10, respectively.

Internal flanges 9 are welded, or otherwise rigidly secured, to shaft 8 and external flanges 10 are bolted, as shown at 11, to the rubber sprocket wheel 7 and to the flange 9 and can be removed from the axle. The ends of shaft 8 are mounted in suitable journals provided at the front end of lever arms 12, which are pivoted to frame 1 at their back end.

As in the above-noted U.S. Patent 3,023,824, a series of supporting wheels 13 are disposed in pairs on transverse shafts mounted within the endless tread 5. Said shafts are supported by a suspension system of the type described in the above-noted Patent 3,023,824.

These wheels 13 bear on the lower ground-engaging run 5′ of the endless tread 5 and also support the upper run 5″.

Endless tread 5 forms at the back of the vehicle a semi-circle partly surrounding the back sprocket wheels 7. Under wet and/or deep snow conditions the vehicle is often slowed down due to the accumulation of snow in the zone defined by the spaced between sprocket wheels 7 and the curved back part of tread 5.

Figure 2:
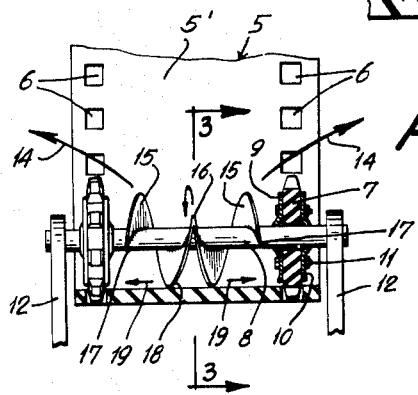
FIGURE 2 is a plan section of the back part of the endless track and of the back sprocket wheel, and showing in plan view the snow-expelling system.

In accordance with the present invention, snow-expelling means are provided in said zone, which positively prevent any accumulation of snow or other foreign material, said means causing said snow or foreign material to be immediately expelled just forwardly of sprocket wheels 7 in the direction of arrows 14, as shown in FIGURE 2, between the open sides of the upper and lower runs. Said means preferably consist of two spirals 15 composed of two sheet metal strips cut and bent to form two helices surrounding shaft 8 and welded thereto at their radially inner edge.

The two spirals are of opposite pitch, are disposed in end-to-end relation and are joined together at 16 by means of welding or otherwise, said joint located substantially at the center of shaft 8. Each spiral 15 makes about one complete turn about shaft 8 and terminates at 17 adjacent a sprocket wheel 7. Edges 16 and 17 are preferably radial with respect to shaft 8.

The spirals 15 have an overall diameter approximately equal to flanges 9 and 10 of sprocket wheels 7. The circular external edge 18 of each spiral 15 makes contact with the inside surface of the endless tread 5, whereby the snow is trapped between the spiral and the endless tread and is expelled towards the sprocket wheels 7 from the center of the endless tread, as indicated by arrows 19, and is thereafter expelled under centrifugal force in the direction of arrows 14.

The inclination of each spiral 15 is selected in accordance with the direction of rotation of shaft 8 in order to displace and expel or throw the snow in the directions herein above mentioned.

The expelling system in accordance with the invention does not require any special transmission or drive because the rotation of shaft 8 provides the necessary driving force for expelling the snow or any other foreign material which may become lodged between the endless tread runs and reach at the back of the tread.

The expelling means in accordance with the present invention have been found to be very efficient in practice, although they are of simple and inexpensive construction. They enable a snow-going endless track vehicle to travel under any snow conditions, even when the snow is deep and wet, without snow accumulating within the endless tread, whereby the vehicle can travel at its maximum speed without any dead-weight.

While a preferred embodiment in accordance with the present invention has been illustrated and described, it is understood that various modifications may be resorted to without departing from the spirit and scope of the appended claim.

What is claimed is:

In a motor vehicle having a flexible endless tread provided with a row of spaced holes near each longitudinal edge of said tread said tread being otherwise imperforate, a series of tread-supporting wheels mounted within said tread in contact with the internal surface of both the lower and upper runs of said tread, a rear transverse shaft and a pair of sprocket wheels mounted in spaced relationship on said rear shaft, the assembly of said shaft and of said sprocket wheels disposed inside and transversely of said endless tread in the rearward part thereof, whereby said sprocket wheels engage said holes and said endless tread forms substantially a semi-circle around said sprocket wheels, means for expelling from the inside of said endless tread snow and other foreign material which may become accumulated therein, said means comprising a pair of spiral flanges secured to and surrounding said shaft between said sprocket wheels disposed in end-to-end relationship and joined together at substantially the center of said shaft, their free ends terminating short of said sprocket wheels and the exterior edge of said spiral flanges being circular and contacting the inside surface of said endless tread, said flanges having opposite pitch and such as to move snow and other foreign material laterally toward said sprocket wheels and expel the same under centrifugal force ahead of said sprocket wheels and laterally outwardly from between said upper and lower runs of said tread.

References Cited by the Examiner

UNITED STATES PATENTS

| | | | |
|---|---|---|---|
| 1,964,637 | 6/1934 | Hurxthal | 198—230 |
| 2,087,813 | 7/1937 | Peterson | 198—230 |
| 3,023,824 | 3/1962 | Bombardier | 180—9.64 |

FOREIGN PATENTS

| | | |
|---|---|---|
| 519,407 | 2/1931 | Germany. |
| 655,213 | 7/1951 | Great Britain. |

BENJAMIN HERSH, *Primary Examiner.*

R. J. JOHNSON, *Assistant Examiner.*